July 16, 1968  K. V. CUSHMAN  3,392,497

MODULAR ENCLOSURE WITH CLAMP JOINED PANELS

Filed Oct. 21, 1966  3 Sheets-Sheet 1

INVENTOR.
KENNETH V. CUSHMAN
BY Herzig, Walsh & Blackham
ATTORNEYS

July 16, 1968 K. V. CUSHMAN 3,392,497
MODULAR ENCLOSURE WITH CLAMP JOINED PANELS
Filed Oct. 21, 1966 3 Sheets-Sheet 2
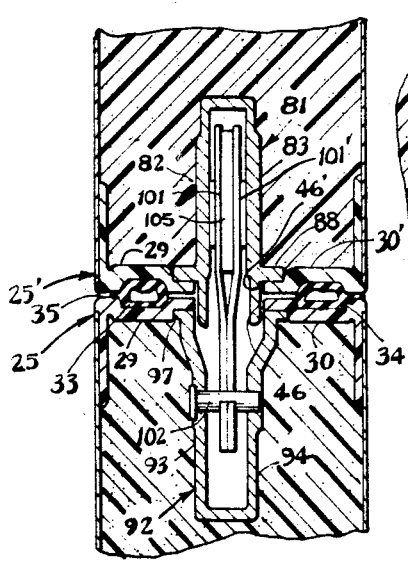
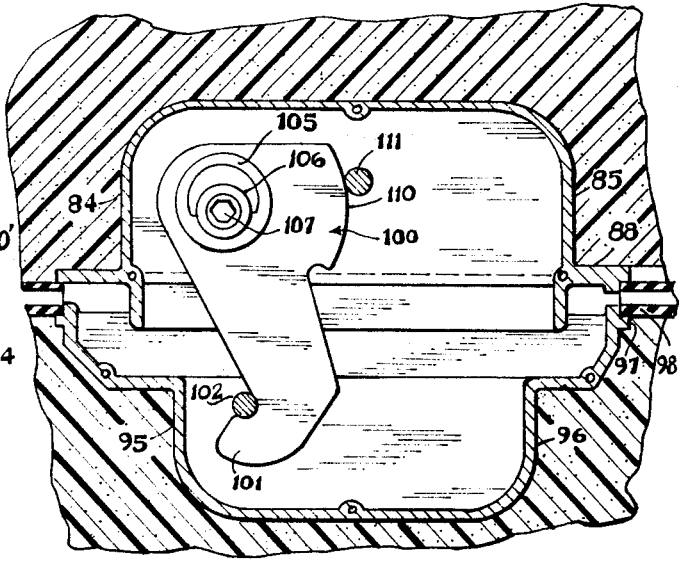
Fig.4  Fig.5
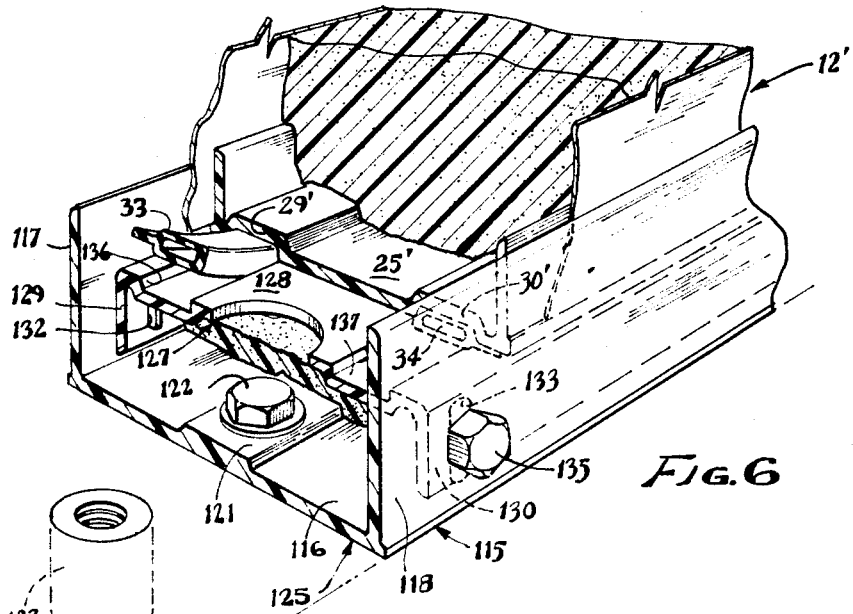
Fig.6
INVENTOR.
KENNETH V. CUSHMAN
BY Herzig, Walsh & Blackmon
ATTORNEYS July 16, 1968 K. V. CUSHMAN 3,392,497
MODULAR ENCLOSURE WITH CLAMP JOINED PANELS
Filed Oct. 21, 1966 3 Sheets-Sheet 3
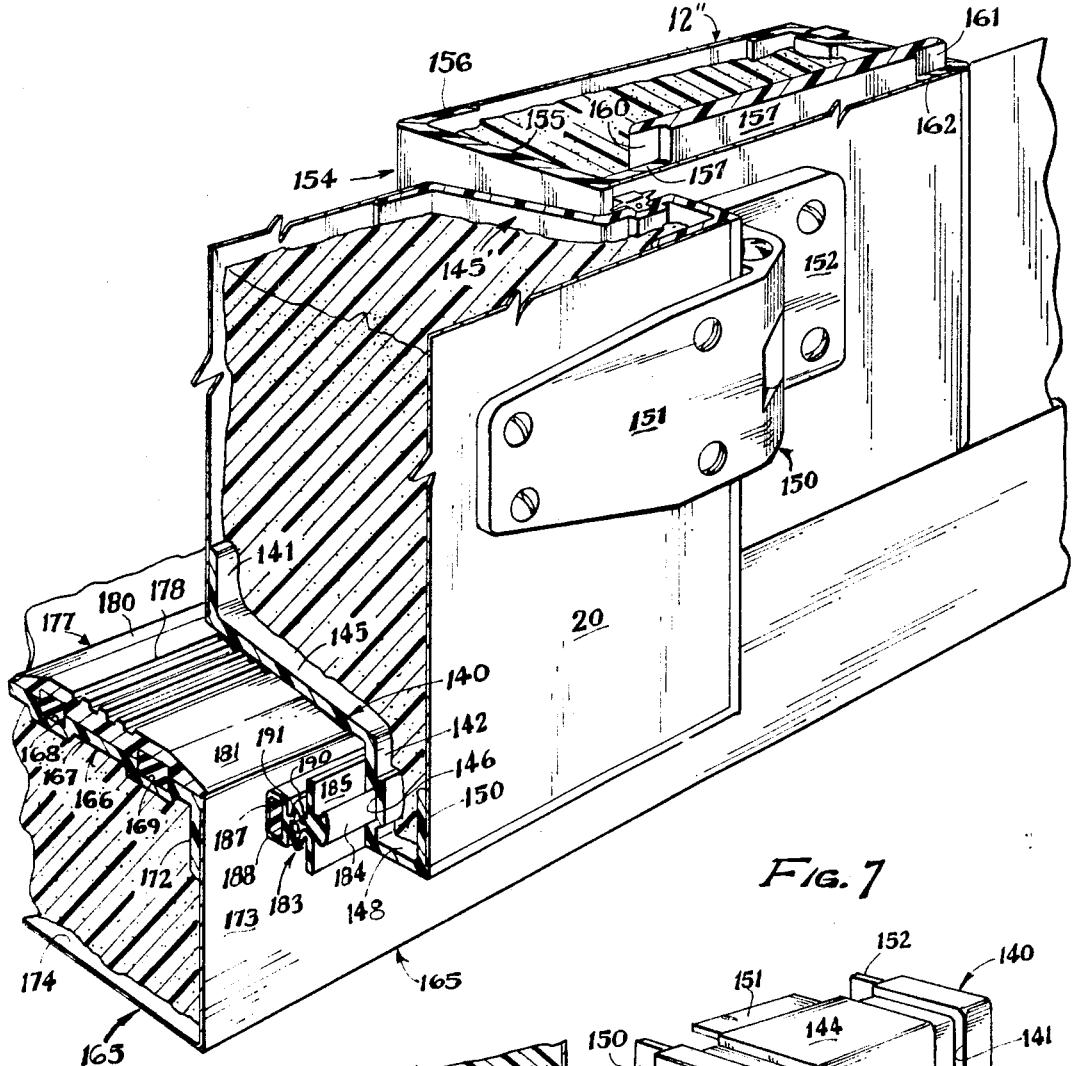
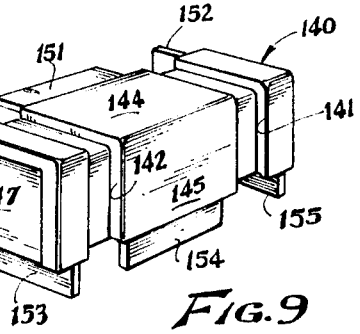
INVENTOR.
KENNETH V. CUSHMAN
BY Herzig, Walsh & Blackham
ATTORNEYS

United States Patent Office 3,392,497
Patented July 16, 1968

3,392,497
MODULAR ENCLOSURE WITH CLAMP
JOINED PANELS
Kenneth Vantine Cushman, Santa Ana, Calif., assignor to
The Delron Company, Inc., Santa Ana, Calif., a corporation of Nevada
Filed Oct. 21, 1966, Ser. No. 588,564
3 Claims. (Cl. 52—272)

ABSTRACT OF THE DISCLOSURE

A modular enclosure comprising similar panels having plastic edge frames, cover sheets adhered to the edge frame and a core of lightweight insulating material. The edge frames are provided with longitudinally spaced openings and clamp housings are positioned inside the panels with openings aligned with the frame openings referred to. One of the clamp housings of each cooperating pair is provided with outwardly extending flanges adapted to enter the cooperating clamp housing in an adjacent panel to thereby key the edges of the panels together. A base member is secured to a permanent floor and is in the form of an upwardly facing channel having an inverted U-shaped member therein. Means are provided for vertically adjusting the inverted U-shaped member and clamping the same in adjusted position whereby to provide a level support for panels of the structure, which panels extend downwardly into the upwardly facing channel to rest on the inverted U-shaped member and sealing means are provided therebetween.

---

This invention relates to the field of modular panel fabrication or construction. The invention is described in an exemplary form herein, which is particularly applicable to the refrigerator industry, although it is to be understood that the invention may be applied in other fields.

Before stating the specific objects of the invention, a brief preliminary description of it is in order. As indicated above, the invention is ideally applicable in the fabrication or construction of walk-in coolers or freezers, which may be fabricated in a series of standard sizes. The herein invention provides for fabrication of such coolers or freezers from panels, each panel being a modular component of the complete construction. The improvements of the invention reside in the particular design and construction of the individual panels, the manner in which they are assembled with each other, and the manner in which they are erected on a foundation to complete the finished construction. The panels are so designed as to be interchangeable with one another in various combinations, thereby enabling fabricators to construct walk-in coolers or freezers, or the like, varying in size in increments of two-foot lengths, starting for example, with a 6 x 6 foot size. The nature of the invention also makes possible the construction of odd sizes of coolers or freezers, such as a 10 x 11 foot box. This is made possible by substituting a special corner section of which one side wall is one foot longer. The panels are attached to each other by completely enclosed clamps, and to make the interchangeability of panels feasible, the invention provides for optimum placement of panel clamps, as will be made clear presently. Coolers or freezers, i.e., "walk-ins," such as referred to herein, can be enlarged at any time using the techniques of the invention by adding standard panels, i.e., modulars, in increments. For example, a 9 x 10 foot walk-in can be increased to 9 x 14 feet by adding one 4-foot panel to both sides as well as the roof and floor sections.

The invention provides a standard method of constructing the panels. In the method there are utilized plastic extrusions of various shapes and lengths machined to precise detail for fabrication of the panels as individual modular units. The panels have completely enclosed panel clamps incorporated in them in predetermined positions as will be described, for securing panels to each other. The extrusions are precision cut to exact lengths. All the necessary machining and assembly operations for panel extrusions are completed for shipment as knockdown units at the factory. Roof and floor panel extrusions require a special injection molded component. These molded parts are bonded to the extrusion ends to form the corners, and, in turn, provide the 90 degree groove for the proper positioning of the gasket. Vertical wall panel extrusions are cut to predetermined lengths and are also assembled into a surround with the use of injected molded corner components. These molded units will become an integral part of the short bottom and top extrusions by bonding them into place at the factory. After completion of the panel surround in this manner, sheet metal or plastic sheets are positioned on both sides of the surround creating a sandwich. Urethane, Styrofoam or fiberglass can be used as the core material. The injection molded components are described in detail hereinafter.

The invention provides for two types of floor construction. In the first type, floor panels are utilized that are interchangeable with the roof panels. This is the preferred construction because of the complete insulation qualities. The second type involves requirements stemming from the fact that it is erected on a concrete slab and involves a levelling operation. The invention provides a floor screed with means for adjusting to an absolute level position, the base of the walk-in prior to erection. Most concrete floors are not truly level and when consideration is given to the accuracy necessary to fit together modular panels of the type described herein, it is apparent that the levelling is essential. The floor screed is the first extrusion laid down on a concrete floor. The screed section is calked prior to ram setting or bolting to the slab. Preferably the screed is in the form of an assembled unit comprising a screed extrusion and a secondary adjustable extrusion incorporated therewith as an assembly. The assembly is packed tight with fiber glass fill to insulate and contribute the necessary spring action requirements. When levelling is necessary, the side bolts are loosened allowing the secondary extrusion to raise. A level is placed on the exposed top surface and adjustments can be made until satisfactory level conditions exist. The side bolts can then be tightened and the panel erection can begin. One corner section panel is placed first and secured. This is followed by all side panels including the remaining corner sections as well as the door panel. The roof panels are positioned and clamped in place last.

All of the extrusions referred to include a one-inch flange to receive the skin sheets. This flange is coated with an adhesive of suitable industrial type, which holds the skin sheets in position. The adhesive is tacky enough to hold both sheets, even in a vertical position for stack curing. Two holes are provided in opposite corners of the surround. One is for inserting the polyurethane foam and the other is for venting or over-flow. Considerable pressures are generated by the polyurethane when it expands. Pressure plates are provided and utilized, preferably in the form of two platens or plywood reinforced plates to maintain and control proper thickness, which by way of example, may be three inches. Various advantages are realized by this technique as referred to hereinafter. The enclosed clamps are provided in predetermined positions along the edges of the panels for clamping them together. The clamps are enclosed in housings or brackets which themselves provide tongue and groove joints as between panels to absorb side loads on all extrusions without it being necessary to incorporate the tongue and groove contours in the extrusions themselves. The location of the tongue and groove joint is ideal because it is centered where the clamping action is.

In the light of the foregoing, the objects of the invention will be appreciated by those skilled in the art. Primarily, as stated, it is an object of the invention to provide (particularly the refrigerator industry), a standard method of constructing and fabricating modular panels.

Another object of the invention is to provide a floor screed having means of adjusting to an absolute level position, the base of the walk-in prior to erection.

Another object of the invention is to provide a means of accepting standard dual gasket material in the modular panels. Double gaskets give full assurance of obtaining an ideal compression-type seal, air-tight to act as a thermo-barrier joint.

The invention contemplates a preferred form of gasket. Preferably, this is a tubular shape but having one flat side to fit against the bottom of a gasket groove. The tubular shape is of soft vinyl material having a lateral flange or tab adapted for either bonding or stapling to the extrusion with which the gasket is used. The tab also serves as a cushion to absorb the compression load created when the panel clamps are tightened drawing the panels together. Rigid thermoplastic material used in the extrusion components is extremely hard and if slightly irregular, gaps may appear, especially between panel clamps on the longer section. The soft pad-like configuration of plastic running the full length of the extrusion not only fills in the small irregularities but eliminates slippage, which is another factor to consider. A corollary object of the invention is to realize the results as stated herein attendant to the use of a gasket having the configuration as described.

Another object is to provide a tongue and groove joint as described above to absorb side loads on all extrusions without incorporating the actual contours of the tongue and groove joints in the extrusion.

Another object of the invention is to realize a totally enclosed panel clamp used in conjunction with panel edge extrusions. The brackets of the panel clamp are made from the same material as the extrusion which is a rigid thermoplastic composition. A mutual bonding agent is used to join all brackets to extrusions as a single unit. Those skilled in the art will appreciate the advantages of purchasing complete close-out units as described herein, precut and perfectly matched for surround assembly.

Another object of the invention is to eliminate the wood close-out edging now used in conventional methods of panel fabricating. Many man hours of labor are required to prepare the wood prior to panel assembly. Expensive machinery and large areas of storage for the bulky wood are required. Particular attention must be and is given to the type of wood purchased. Consideration as to dryness, cracks, and straightness are very important prerequisites, all eliminated by the use of the extruded system of this invention. Accuracy regarding the actual placement of the panel clamps, cutting the slots to receive the clamps are all labor consuming detail that confront the manufacturer of wood close-out panels. Another saving to be considered is the shipping weight of the end product. Panels manufactured with plastic weigh far less than the conventional wood type.

It is also a well-known fact that once wood edging is wet or even damp, it becomes a conductor of cold or heat. On the other hand, rigid thermoplastic will not absorb moisture and, characteristically, is a non-conductive material. Modular panel fabricators will benefit from this new surround material, enabling them to offer uniform insulated panels throughout their system.

Another object is to realize savings of metal working labor, the machinery required to form the metal and "in process" handling time required for same. The prior methods of construction panels involving sheet metal sides never produces a full standard size panel. For instance, a 4 x 8 foot sheet metal skin, a standard size used by the industry, is not square nor uniform in length when produced at the mill. Before it can be used by fabricators, a shearing operation is introduced cutting at least two sides, a total of ¼ inch to square the corners and obtain a perfect rectangular shape. For conventional construction, this squaring operation is then followed by notching the corners and the bending four sides down ⅞ of an inch. This pan configuration now represents the full size panel. The original 4 x 8 foot sheet has shrunk to 46 inches by 94 inches, reducing a cooler or freezer size two inches for every panel used.

The herein invention using plastic extrusions permits the user to place the squared sheet into the plastic surround. the ⅛ inch bead characteristic to all extrusions displaces ¼ inch of metal lost in the trimming or squaring operation.

Another object of the invention relates to the various types of material that would be permissible to use as skins. Conventional walk-in construction must use metal in order to bend as per design requirements. The extrusion system of this invention provides a bonding surface to receive any type of material in sheet form. Marlite, a thin ⅟₁₆ inch Masonite sheet enameled on one side, is of interest to the industry to dress up the exterior of their walk-ins. So far, they have been limited to baked enamel sides or plain, but costly aluminum or stainless steel skins.

Another object of the invention is to provide the fabricator with an inexpensive and extremely light weight door. A standard magnetic type gasket may be provided in the door surround extrusion. This same extrusion in turn houses the heater wires, a necessary innovation to defrost this area of the door. The wire diffuses a moderate amount of heat that provides positive protection against condensation or frost formation.

The invention may be used in other fields as stated in the foregoing, such as the construction of environmental rooms, testing chambers, incubators, seed germinators, and for other specialized technical uses.

Further objects and additional advantages of the invention will become apparent from the following detailed description and annexed drawings wherein:

In FIGURE 1 is a partly broken away perspective view of a walk-in box constructed in accordance with the principles of this invention;

FIGURE 4 is a sectional view through two joined panels illustrating the clamping members and the tongue and groove relationship between the clamp brackets or housings;

FIGURE 5 is a side view of the structure of FIGURE 4;

FIGURE 6 is a partly broken away perspective view of a floor screed assembly;

FIGURE 7 is a partly broken away perspective view of a door assembly showing the door gasket, door surround, threshold extrusion, and reinforcing extrusion in the panel to which the door is hinged;

FIGURE 8 is a partial sectional view of the lower part of the door showing the seal at the bottom thereof, i.e., the adjustable floor wiper;

FIGURE 9 is a perspective view of the corner piece used to form the vertical wall corners.

Figure 1:
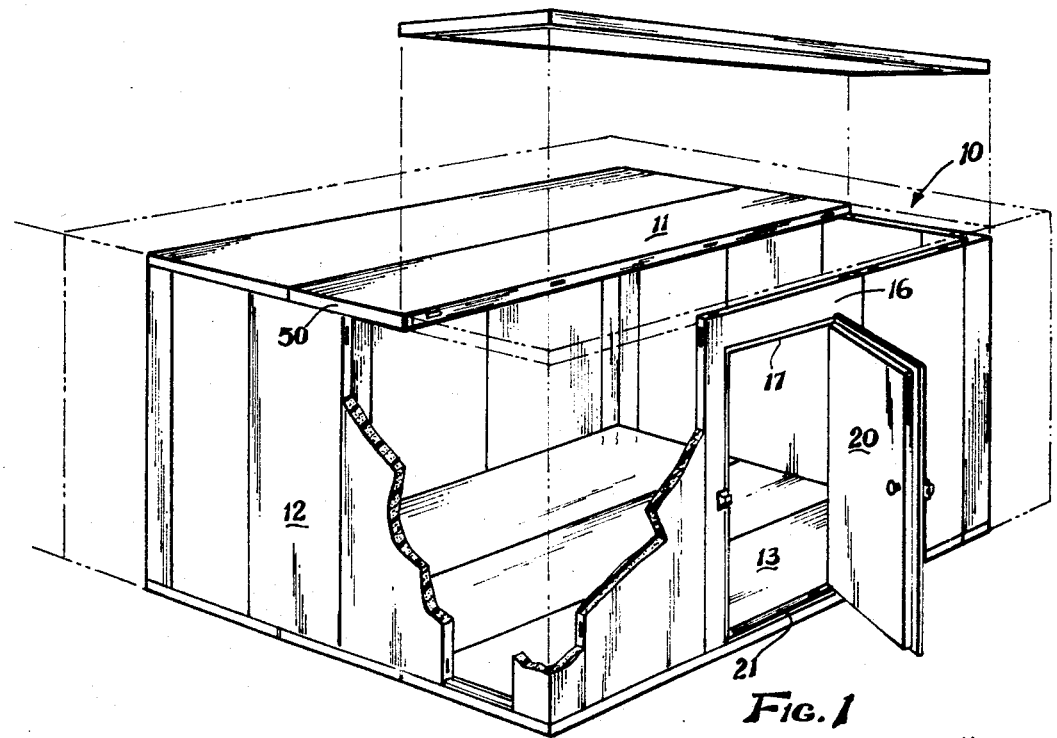

Referring now more particularly to FIGURE 1 of the drawings, numeral 10 shows a prefabricated walk-in box of a standard size representing one of a complete series of standard sizes, the box being fabricated or assembled from panels constructed in accordance with the herein invention. Each panel is a modular component of the completely fabricated box. In FIGURE 1, numeral 11 designates a standard roof panel; numeral 12 designates a standard side panel; and numeral 13 designates a standard floor panel. Numeral 16 designates a side panel having a door frame 17 in it having a hinged door 20 which will be described more in detail presently. The threshold of the door is designated at 21. It will be noted that joints between roof panels are spaced from, rather than alined with joints between wall panels, which similarly are spaced from joints in floor panels.

Figures 2, 3:
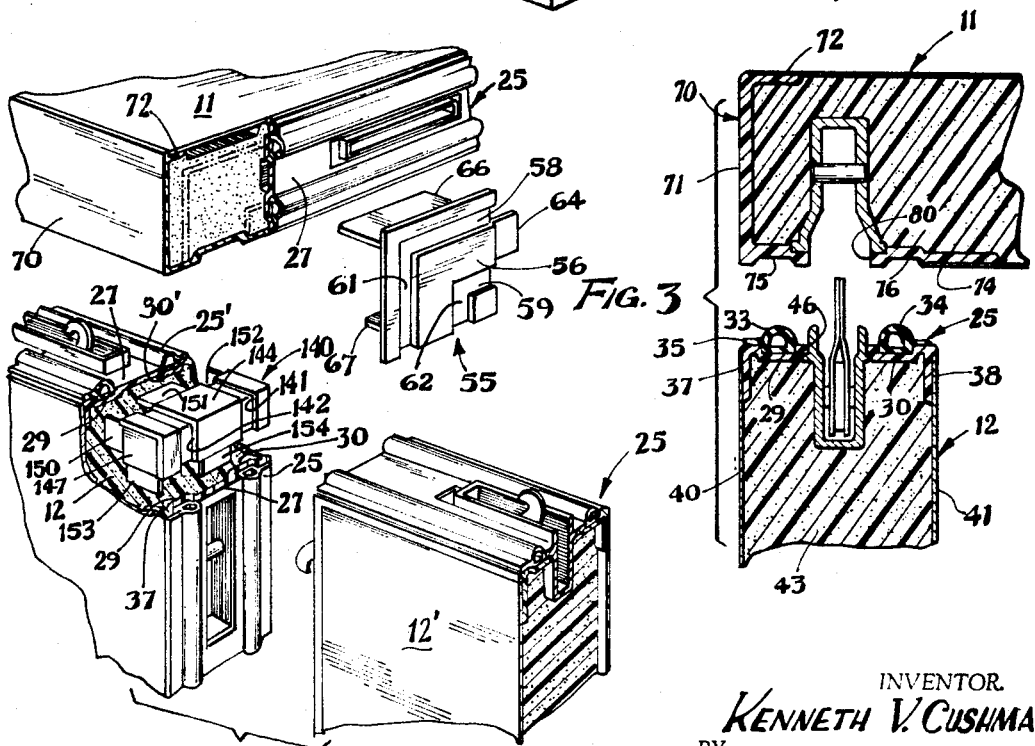
FIGURE 2 is a detail exploded perspective view showing the joint between two side panels and between a side panel and a roof panel.
FIGURE 3 is a sectional view showing the joint between a side panel and a roof panel and showing the clamp members.

The construction of the roof and side panels is illustrated in FIGURES 2 and 3. Numeral 25 designates an edge member or edge extrusion preferably extruded from plastic. Two of these extrusions are shown at 25 and 25' in FIGURE 4. These are extrusions which form the mating edges of roof, wall, and floor panels. As may be seen in FIGURES 2, 3, and 4, this extrusion has a flat surface 27 having two elongated depressions or grooves therein as shown at 29 and 30 in FIGURE 3. When panels are clamped together as shown in FIGURE 4, complementary opposing grooves come into juxtaposition as shown providing channels to receive dual gaskets 33 and 34 formed of gasket material.

The gaskets preferably have a shape as shown being made of soft vinyl material. They are of tubular form with an extending tab as shown at 35, with one flat side which adapts them to be fitted into a seat in a gasket groove. The flange or tab 35 is either bonded or stapled to the extrusion. The flange or tab serves the purposes described in the foregoing.

The extrusion 25 has extending right angle side flanges as shown at 37 and 38. All edge extrusions have similar extending flanges. The edge extrusions form a complete surround for the panel, as will be described. The panel is enclosed by thin side sheets or skins as designated at 40 and 41. These side sheets are made of any suitable material which may be metal or other material. The side sheets are bonded to the extending flanges as shown exemplarly at 37 and 38 by adhesive bonding. Any of the various commercially known industrial adhesive bonding agents may be used. The bond provides a completely water-tight joint not subject to weakening or deterioration. Numeral 43 designates the core material which may be any of various materials as previously referred to, such as urethane. Styrofoam block or fiber glass. The manner or preferred technique by which the panels are actually fabricated will be referred to presently.

The extrusions 25 and 25' have rectangular elongated intermediate openings therein as designated at 46 and 46', which openings are to receive the housings or brackets for the clamping members. (See FIG. 4.) These housings and the clamping members will be described in detail presently.

Referring again to FIGURE 2, numeral 70, designates an edge extrusion which forms an end close-out for an end edge of the roof panel 11. This edge is one that is not brought into juxtaposition and clamped to another panel. This extrusion is shown in detail in FIGURE 3 and will be more fully described presently in connection with that figure.

Numeral 55 designates a molded corner injection fabricated from similar material and configuration to adapt or accommodate an edge member 25 on a roof panel to an edge member 25 on a side panel 12. This injection is generally rectangular having a flat surface 56 and having horizontal grooves 58 and 59 communicating with similar right angle grooves 61 and 62, the grooves being configurated to receive the gasket members as previously described. The injection 55 has an extending flange 64 which in the assembly is received between the grooves 29 and 30 of the edge member 25 as may be seen in FIGURE 2. It has extending flanges 66 and 67 extending normally to the injection. The flange 66 extends at a position between the end of edge extrusion 25 and the end of flange 72 on extrusion 70, lying in the same plane as this flange and being in a position to have a skin sheet adhesively bonded thereto. Flange 67 on the opposite side extends into a position between grooves 75 and 76 of extrusion 70, wherein the skin sheet may be adhesively bonded thereto.

Referring to FIGURES 2 and 9, numeral 140 designates an injection molded corner component adapted for vertical wall corners as previously referred to. This corner member eliminates the need for mitered corner joints between extrusions. Referring to FIGURE 2, the extrusion 25' is like extrusion 25, except that one of these extrusions carries the housing for the hook part of the clamping means and the other carries the bar that is engaged by the hook of the clamping means. The corner piece 140 is a right angular member, as shown, which engages or mates with the shortened ends of the horizontal extrusion 25' and the vertical extrusion 25. It has right angle gasket grooves 141 and 142, which come into juxtaposition with the grooves 29 and 30 in the extrusion 25, and the grooves 29' and 30' in the extrusion 25'.

The corner piece has an exterior surface 144 that comes flush with the surface 27 of extrusion 25 and exterior surface 145 that comes flush with the surface 27' of extrusion 25. It has end surfaces, such as shown at 147, which surface comes flush with the outer surface of the flange 37 of extrusion 25, the other end surface coming flush with the outer surface of flange 38 of extrusion 27'. The corner plate piece 140 has extending parts 150, 151, and 152 that cooperate with the extrusion 25. Extension 150 fits against the inside of flange 37'; extension 151 fits in between the groove 29' and 30' of extrusion 25'; and extension 152 fits against the inside of flange 38' of extrusion 25'. The other side of corner piece 140 has extensions 153, 154, and 155. Extension 153 fits against the inside of flange 37 of extrusion 25; extension 154 fits in between the grooves 29 and 30; and extension 155 fits against the inside of flange 38 of extrusion 25. As can be seen, therefore, the injection molded corner piece forms a 90 degree member which accommodates the horizontal and vertical extrusions to each other for joining and accommodating the panel surround to continuous gasket members.

FIGURE 3 shows floor-ceiling end close-out extrustion 70 in detail. FIGURE 3 shows how this extrusion closes an edge of a roof panel 11 and accommodates it to securement to a wall panel. The extrusion has an end web 71 with a right angle inwardly extending flange 72 to which the skin sheet is adhesively bonded as described. The extrusion 70 has a web part 74 having in it the grooves 75 and 76 for the dual gasket strips. It has an opening 80 to receive a housing of the clamping bracket as will be described. FIGURE 3 shows clamping bracket housings in a roof panel and in a side wall panel. FIGURE 4 shows the clamping bracket housings in position clamping two side wall panels together. The clamping members themselves may be like those as shown in detail in the earlier filed application, Ser. No. 430,693, filed Feb. 5, 1965. Referring to FIGURE 4, numeral 81 designates a formed bracket or housing for the clamping hook of the clamp device. This housing has side walls 82 and 83 and end walls 84 and 85 which walls extend through the openings 46' and 46 in the end member extrusions 25' and 25 so that a tongue and groove joint is formed. Adjacent the extending tongue part of the housing there is an extending flange 88 extending around the housing which fits against the end member 25' adjacent to the grooves 29' and 30'. The housing 81 is bonded by a suitable adhesive to the end extrusion 25'.

Numeral 92 designates a second similar housing having side walls 93 and 94 and end walls 95 and 96. The outer part of this housing is elongated as shown in FIGURE 5 and laterally enlarged or flared as shown in FIGURE 4. It has an end flange which seats against the extruded end member 25 adjacent to grooves 29 and 30 as shown. Adjacent the end flange there is a square shoulder as shown at 98 which receives the corner edge of opening 46 in member 25.

The clamping device comprises a hook 100 having a configuration as shown in FIGURE 5 having a hooked end 101 which hooks over a rod member 102 that extends between the side walls 93 and 94. Hook 100 is formed of two similar pieces or laminations 101 and 101' as shown in FIGURE 4, which are flush with each other at the hook end and spaced at the other end. The hook members 101 and 101' have circular openings journalled on a cam disc 105 having an eccentric hub 106. Hub 106 has a hexagonal driving opening 107. The cam disc 105 has an annular interrupted rib extending between pieces 101 and 101' and cooperating with detents on the interior thereof to form a slip clutch. In operation hook 100 is rotated by a tool inserted in opening 107 to draw the two panels tightly together to hold them in that position. The hook is first rotated and then through the action of the slip clutch is moved linearly to cause the hook to pull on pin 102 as described in more detail in the earlier application referred to. The extending parts of the housing 81 as explained, form a tongue which is part of a tongue and groove joint formed between the panels which accommodates the side thrust and loads on the panels. The hook 100 has an arcuate surface 110 that cooperates with a pin 111 extending between the side walls 82 and 83, for holding the hook in retracted position.

The clamping device shown in FIGURE 3 is like the one shown in FIGURES 4 and 5 as just described.

FIGURE 6 shows a typical floor section showing the adjustable floor screed mounted on a concrete base or footing. The floor screed is an extrusion as designated at 115 having a base member 116 and side walls or flanges 117 and 118. Numeral 12' designates a typical side wall panel having a bottom end extrusion 25' having gasket grooves 29' and 30'. The floor screed 115 has a central rib 121 which is bolted to the floor by means of a bolt 122 extending through it and into a threaded fitting 123 that is buried in the concrete floor. Calking compound is applied between the bottom horizontal member of the floor screed and the concrete as designated at 125. The floor screed assembly additionally comprises the extrusion 127 which is of inverted U-shape having a horizontal part 128 and side flanges 129 and 130. The extrusion 127 is in an inverted postion within the screed extrusion 115. The extrusion 127 has vertical slots 132 and 133 in its side legs or flanges. Bolts extend through the flanges 117 and 118 of the floor screed 115 and through the slots in the flanges 129 and 130 of the extrusion 127, as shown at 135 so that the extrusion 127 is vertically adjustable whereby the supports for the side walls of the box are vertically adjustable for accurate leveling, which is of course necessary as explained in the foregoing, since most concrete floors are not truly level. The extrusion 127 has gasket grooves 136 and 137 which come into juxtaposition with the grooves 29' and 30' in the edge extrusion 25' to receive the gasket members 33 and 34.

FIGURES 7 and 8 show the construction and mounting of the lightweight door 20 and the manner of sealing it in the door opening.

The floor screed as shown in FIGURE 6 terminates adjacent to the door opening. The bottom of the door cooperates with a threshold panel as will be described.

The door 20 has a cross-sectional configuration as shown in FIGURE 7. It is in the form of a panel at each of the edges of which there is an edge extrusion such as designated at 140 in FIGURE 7. This extrusion has an upright or vertical flange part 141; an upright or vertical flange part 142 at the other side. Between these parts is the angular or slanting edge part 145. The upright part 142 has in it a single groove 146 for receiving a gasket or seal member. At the end of the upright part 142 is a horizontal part 148 and at the outer edge of this part is the upright or vertical flange 150 to which the skin or face sheet of the panel is adhesively bonded. The other skin or face sheet is adhesively bonded to the flange 141. Numeral 145' designates the edge extrusion which is used at the rear edge of the door. This extrusion has the same configuration as extrusion 145. The edge extrusion at the vertical edges and at the top and bottom are alike so that a complete surround is formed for the door with the skin sheets secured thereto in the manner previously described and with the core material filling the interior.

The door is hinged to the box by a hinge 150 having a part 151 hinged to another part 152 by a hinge pin, the part 152 being attached to the panel 12" in a suitable manner. The wall panel 12" is like the wall panels previously described except in the following respects. At the inner edge it is completed by an edge close-out extrusion 154 which is U-shaped having a web part 155 and side flange parts 156 and 157 to which the skin sheets are adhesively bonded. Furthermore, with the outer side of the panel 12" there is used a reinforcing extrusion 157 which is a flat sheet with narrowed edges 160 and 161. This sheet is placed in a position flush with the outer skin sheet of this panel with the flanges 157 and 162 engaging the surfaces 160 and 161 as shown. This reinforcing panel is necessary in order to support the weight of the door.

The door is hung over a threshold panel designated generally at 165. This panel is generally rectangular. It comprises an angular extrusion as designated at 166 having a horizontal part 167 having gasket grooves 168 and and 169 and having an angular flange part 172. This panel has a sheet metal side wall 173 adhesively bonded to the flange 172 and this sheet metal having a horizontal bottom part 174. The panel 165 is filled with the light-weight core material. Superimposed on the extrusion 166 is a threshold extrusion 177 which has a grooved central upper portion 178 with the top surface slanting or tapering at the edges as shown at 180 and 181.

Sealing and holding or latching means are provided completely around the inside of the edge overhang of the door 20 as shown in FIGURE 7. This is a magnetic neoprene seal with a heater wire embodied therein to defrost this area of the door. The magnetic seal comprises a neoprene member having a cross sectional shape as designated at 183 in FIGURE 7. This cross section includes a rib 184 that fits in the gasket groove 146 and an extending flange part 185 that fits against the upright part 142 of the extension 140. On the inside of the neoprene member is a rectangular housing 187 containing a magnetic strip 188 adapted to hold the door in engagement with the metal sheet 173 and metal skin sheets of the panels surrounding the door opening where metal skin sheets are used on these panels. Between the housing part 187 and the flange 188 is a flexible bellows-like part 190 adapted to collapse when the door is brought into engagement with the surfaces surrounding the door opening. With this part is a heater wire or wires 191 adapted for defrosting this area around the door.

FIGURE 8 shows an alternative arrangement wherein the floor panel section 165 is not used but instead a sealing wiper that directly engages the concrete floor is used. The concrete floor is designated at 200. On the inside of the bottom overhang of the door a U-shaped spring bracket 201 is attached by a screw 202. A sealing gasket 203 is provided in the groove 146 to seal against the inner leg of the bracket 201. The bracket 201 secures the upper part of a flexible adjustable wiper 205, the upper part of which 206 is rounded, with reinforcing metal cap 207 over it. On the inside of the wiper 205 is a metal reinforcing backer 208. The lower edge of the wiper wipes directly on the surface of the concrete floor 200.

From the foregoing those skilled in the art will understand the construction of the panels and the manner in which they are affixed together and erected into an enclosure such as a walk-in box. Each panel is fabricated into the construction described in accordance with a standard simplified method. The preferred method is that the panels are fabricated or constructed in the manner described in the foregoing using the various extrusions and bonding the skin sheets by an adhesive. Preferably the core material is then injected into the panel. This is done after the assembled panel surround has been completed and the skin sheets attached by the adhesive. The adhesive is sufficiently tacky to hold the skin sheets even in a vertical position for stack curing. Two holes are provided in opposite corners of the surround of the panel. One of these is for inserting the core material such as polyurethane and the other for venting or overflow. Ordinarily, the bonded surfaces are not sufficient or adequate to resist the pressures generated by the pouyurethane when it expands. To accommodate for this factor pressure plates are used in the form of two platens or plywood reinforced plates between which the panel is held to maintain and control proper thickness. The platens may be supported or held in any suitable manner or clamped together to hold the panel to the proper thickness as the core material is inserted. The method described herein is the preferred one, although other methods might be used to complete a panel.

From the foregoing those skilled in the art will observe that the invention as described herein achieves and realizes all of the objects and advantages as set forth in the foregoing, as well as having many additional advantages that are apparent from the detailed description. The invention provides a standard method for fabricating the panels. Both the panel construction and the method provide for improved economy. Simplified means are provided for erecting panels on an absolute level to facilitate securement together of the panels. The means accommodating the panels to improved dual gasket material is simplified but effective. The brackets or housing for the clamping members themselves provide a tongue and groove joint between panels to absorb side loads. Wood close-out edgings around panels and attendant expenses are eliminated. Constructional techniques are simplified and costs are thereby reduced, all as elucidated more fully in the introduction hereto.

The foregoing disclosure is representative of a preferred form of the invention and is to be interpreted in an illustrative rather than in a limiting sense, the invention to be accorded the full scope of the claims appended hereto.

What is claimed is:

1. A modular structure supported by a floor, comprising: an elongated fitting having a bottom and upstanding side walls, said bottom being secured to said floor; an elongated inverted U-shaped fitting having a web portion extending between said side walls and downwardly extending sides engaging the inner faces of said side walls; means for adjustably securing longitudinally spaced portions of said downwardly extending sides to said side walls whereby to level said U-shaped fitting; and at least one wall panel having its lower edge portion resting on said web portion between said side walls; said lower edge portion of said panel and said web portion having cooperating configurations defining means for retaining gasket strips therebetween.

2. A panel for use in modular construction, comprising: plastic members defining a rectangular edge frame having panel edge defining portions and inwardly extending flanges at opposite edges thereof; skin sheets adhesively secured to the other faces of said flanges and defining opposite faces of said panel; the interior of said panel being filled with lightweight insulating core material; certain portions of said edge frame having a plurality of first openings spaced therealong; clamp housings embedded in said panel and having openings aligned with said first openings, said housings having portions abutting the inner faces of said edge frame adjacent said first openings, certain of said housings having flange elements extending outwardly through said first openings and adapted to enter an opening in another housing inwardly of an opening, corresponding to said first openings, in an adjacent panel and thereby key said panels together.

3. A panel as defined in claim 2 wherein said edge frame is provided with spaced longitudinal grooves, laterally outwardly of said first openings, adapted to face corresponding grooves in an adjacent panel to define channels for sealing gasket means.

References Cited

UNITED STATES PATENTS

| | | | |
|---|---|---|---|
| 2,535,682 | 12/1950 | Jones | 62—443 |
| 2,647,287 | 8/1953 | Jones | 52—582 |
| 2,821,754 | 2/1958 | Hillson | 52—627 X |
| 2,844,848 | 7/1958 | Couse et al. | 52—238 X |
| 2,884,669 | 5/1959 | Hillson | 52—627 X |
| 2,899,720 | 8/1959 | Vollmer | 49—479 |
| 2,958,210 | 11/1960 | Rill | 62—440 |
| 3,113,401 | 12/1963 | Rose | 52—615 X |
| 3,126,590 | 3/1964 | Monti | 49—478 |
| 3,164,869 | 1/1965 | Barkan | 49—401 X |
| 3,167,931 | 2/1965 | Bryson | 49—478 X |
| 3,170,269 | 2/1965 | Dunnington | 52—293 |
| 3,231,054 | 1/1966 | Gartrell | 52—290 X |
| 3,310,917 | 3/1967 | Simon | 52—624 X |
| 3,310,926 | 4/1967 | Brandreth et al. | 52—582 |

FRANK L. ABBOTT, *Primary Examiner.*

C. G. MUELLER, *Assistant Examiner.*